(12) United States Patent
Wolfe, IV et al.

(10) Patent No.: US 8,397,529 B2
(45) Date of Patent: Mar. 19, 2013

(54) EVAPORATOR PHASE CHANGE THERMAL SIPHON

(75) Inventors: Edward Wolfe, IV, E Amherst, NY (US); Ilya Reyzin, Richmond Hts, OH (US); Prasad S. Kadle, Williamsville, NY (US); James A. Bright, Gasport, NY (US)

(73) Assignee: Delphi Technologies, Inc., Troy, MI (US)

( * ) Notice: Subject to any disclaimer, the term of this patent is extended or adjusted under 35 U.S.C. 154(b) by 952 days.

(21) Appl. No.: 12/481,933

(22) Filed: Jun. 10, 2009

(65) Prior Publication Data

US 2010/0313587 A1    Dec. 16, 2010

(51) Int. Cl.
*B60H 1/32*    (2006.01)
(52) U.S. Cl. ............................................. 62/244; 62/515
(58) Field of Classification Search .................... 62/244, 62/323.1, 407, 434, 498, 515, 524
See application file for complete search history.

(56) References Cited

U.S. PATENT DOCUMENTS

| | | | |
|---|---|---|---|
| 4,964,279 A | 10/1990 | Osborne | |
| 5,086,832 A * | 2/1992 | Kadle et al. ..................... 165/76 |
| 5,277,038 A | 1/1994 | Carr | |
| 5,366,005 A * | 11/1994 | Kadle ........................... 165/140 |
| 5,509,199 A * | 4/1996 | Beamer et al. ............. 29/890.07 |
| 5,553,662 A | 9/1996 | Longardner et al. | |
| 5,579,830 A | 12/1996 | Giammaruti | |
| 6,397,618 B1 | 6/2002 | Chu et al. | |
| 6,408,633 B1 | 6/2002 | Carr | |
| 6,973,799 B2 | 12/2005 | Kuehl et al. | |
| 7,043,931 B2 | 5/2006 | Plummer | |
| 7,134,483 B2 | 11/2006 | Barnwell | |
| 7,156,156 B2 | 1/2007 | Haller et al. | |

* cited by examiner

*Primary Examiner* — Melvin Jones
(74) *Attorney, Agent, or Firm* — James M. Chan

(57) ABSTRACT

An air conditioning system including an evaporator having a manifold and a plurality of tubes extending downward in a vertical direction from the manifold. The evaporator defines at least one PCM tank engaging the manifold for storing a phase change material. When operating in a first operating mode, heat is transferred from the phase change material to the refrigerant to freeze and cool the phase change material. When operating in a second operating mode, heat is transferred from the refrigerant to the frozen phase change material to condense the refrigerant. The condensed refrigerant falls downwardly through the tubes and receives heat from a flow of air to cool the air and evaporate the refrigerant. The evaporated refrigerant rises upwardly back to the low pressure of the cold manifold.

24 Claims, 4 Drawing Sheets

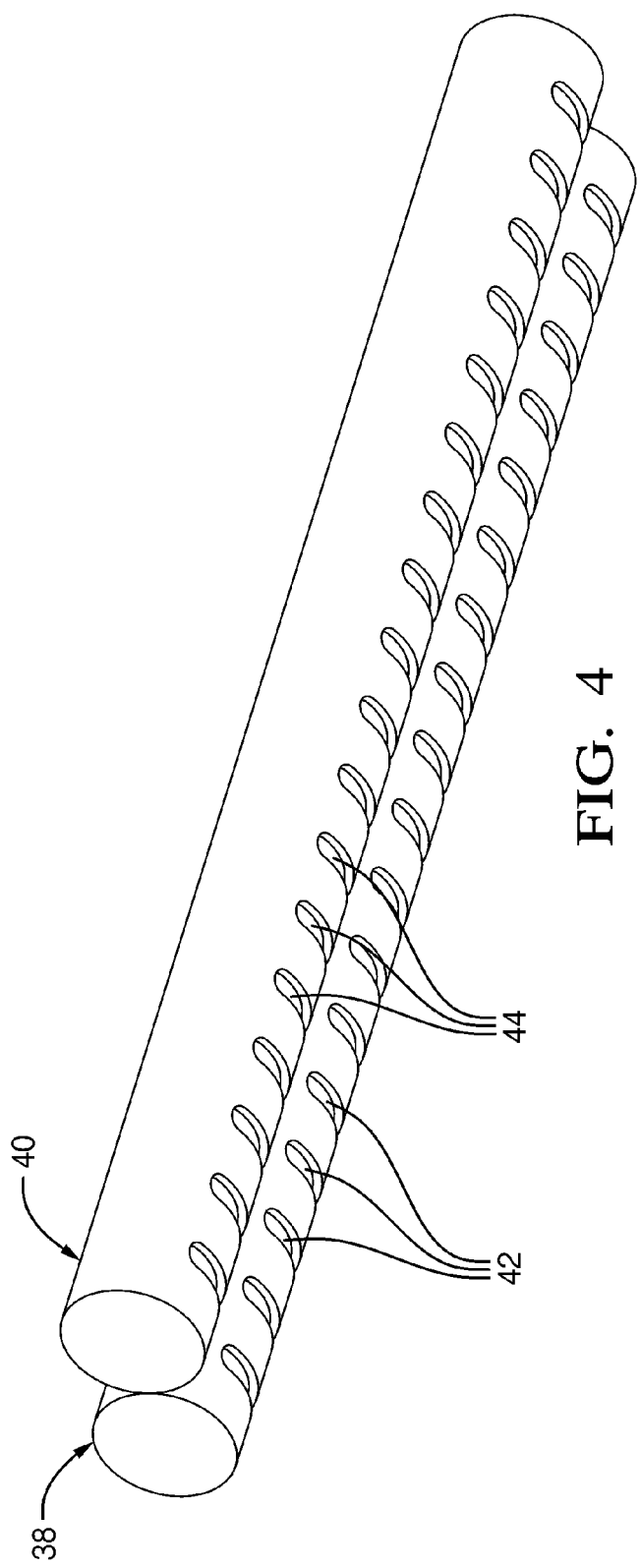
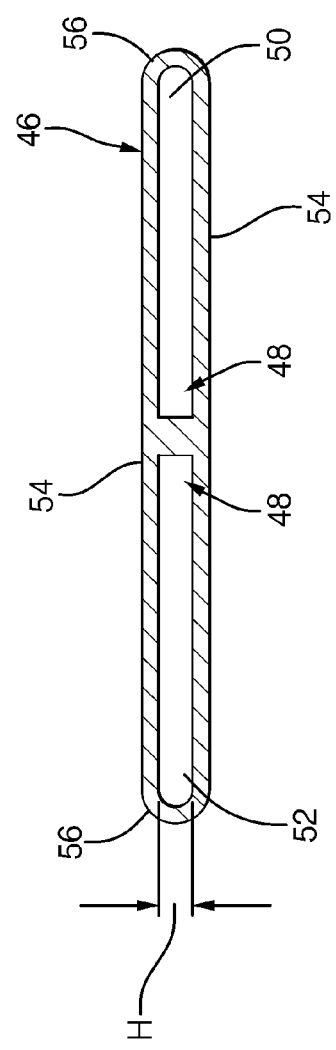
FIG. 4
FIG. 5

EVAPORATOR PHASE CHANGE THERMAL SIPHON

BACKGROUND OF THE INVENTION

1. Field of the Invention

An air conditioning system for cooling the cabin of a vehicle.

2. Description of the Prior Art

Fuel efficiency in vehicles is enhanced by shutting off the gasoline engine during inefficient periods, such as when the vehicle is coasting or temporarily stopped. However, the compressor of a traditional air conditioning system runs off the crankshaft of the gasoline engine, and therefore, the gasoline engine continues to operate during those inefficient periods to prevent uncomfortable conditions for the passengers of the vehicle. It is desirable to have an air conditioning system that continues to operate when the engine is shut off, so that vehicles may shut off their gasoline engine during those inefficient periods.

U.S. Pat. No. 7,156,156, issued to Haller et al. on Jan. 2, 2007 (hereinafter referred to as Haller '156), provides one solution to the problem of the air conditioning system not functioning when the engine is not running. The Haller '156 patent shows an evaporator having a refrigerant flowing there-through for transferring heat from a flow of air to the refrigerant in a first operating mode with the engine of the vehicle running. The evaporator includes a manifold extending in a horizontal direction. At least one tube is in fluid communication with manifold and extends downward in a vertical direction away from the manifold. The evaporator defines at least one cavity, or phase change material (PCM) tank, for storing a phase change material to transfer heat from the phase change material to the refrigerant to cool and freeze the phase change material in the first operating mode with the engine of the vehicle running.

The cavities of the Haller '156 patent are disposed adjacent to and engaging the plurality of tubes. In a second operating mode with the engine of the vehicle dormant, heat is transferred directly from the flow of air to the phase change material in the cavities to cool the flow of air and to melt or warm the phase change material. There remains a continuing need for improved air conditioning systems that continue to operate during inefficient periods when the engine of the vehicle is shut off.

SUMMARY OF THE INVENTION

The invention provides for such an air conditioning system and wherein the PCM tank engages the manifold of the evaporator. In the second operating mode, heat is transferred from the refrigerant to the frozen phase change material to cool and condense the refrigerant. The refrigerant falls downward in the vertical direction through the tube. The condensed refrigerant then receives heat from the flow of air to cool the flow of air and to warm and evaporate the refrigerant. The evaporated refrigerant rises upwardly in the vertical direction back to the low pressure of the cold manifold where it dispenses heat to the frozen phase change material.

The air conditioning system provides for an improved passive system for cooling the cabin of a vehicle, both when the engine is running and dormant. It can also be used in a non-vehiclular application. It is less volumous, cheaper and easier to manufacture than the air conditioning systems of the prior art that continue to operate when the engine of the vehicle is dormant. Additionally, because the PCM tank engages one of the manifolds instead of the tubes, it does not obstruct the flow of air. Lastly, it can be integrated into a pre-existing evaporator by engaging a PCM tank to one of the manifolds of the evaporator.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of the exemplary embodiment of the input and output manifolds; and FIG. 5 is a cross-sectional view of one of the tubes taken along Line 5-5 of FIG. 2.

DETAILED DESCRIPTION OF THE EXEMPLARY EMBODIMENT

Figure 3:
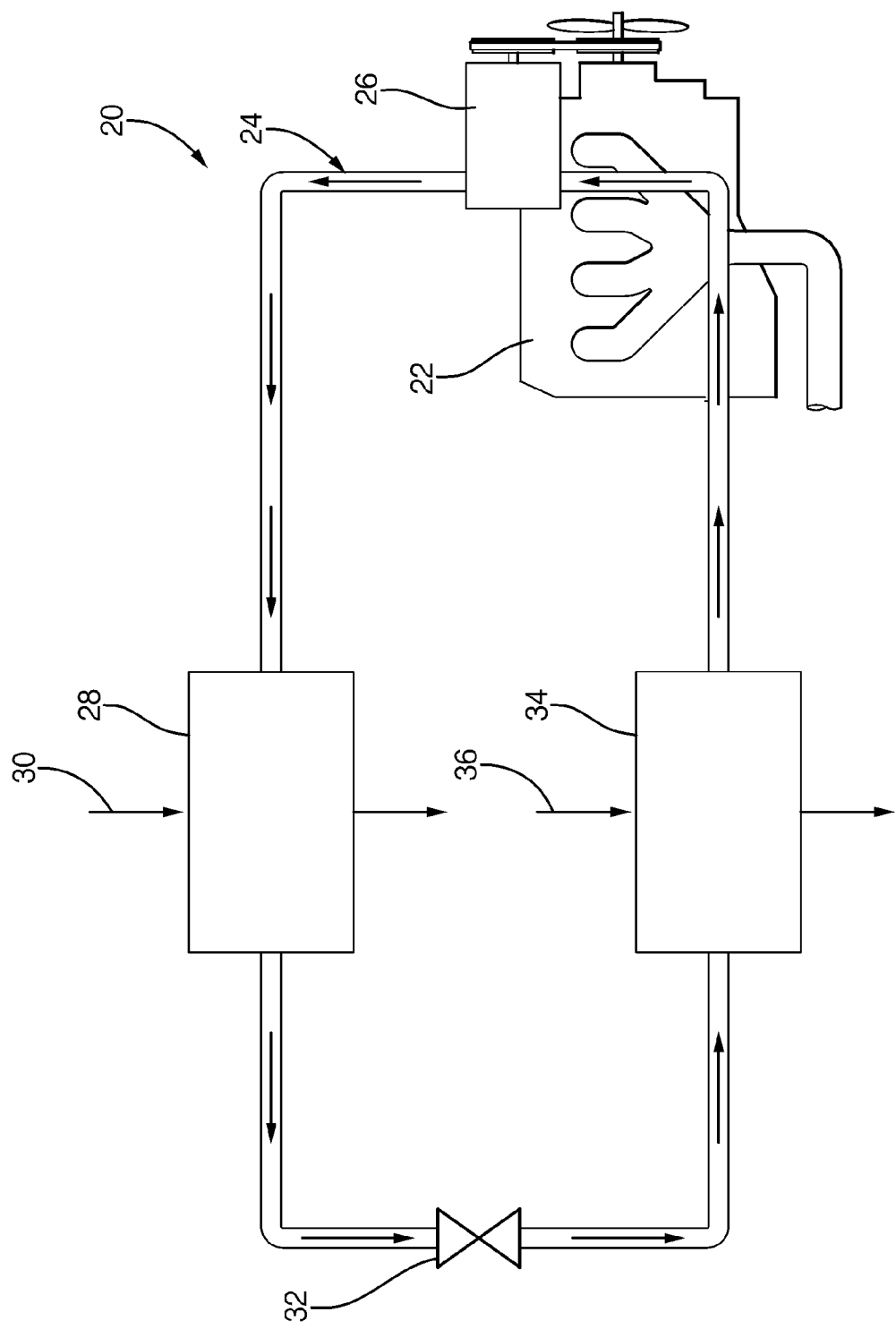
FIG. 3 is a flow-chart of the exemplary embodiment of the air conditioning system.

Referring to the Figures, wherein like numerals indicate corresponding parts throughout the several views, an air conditioning system 20 is generally shown in FIG. 3. In the exemplary embodiment, the air conditioning system 20 is shown in a vehicle having an engine 22, but the air conditioning system 20 could also be used to cool a building or any other structure. The vehicle of the exemplary embodiment has a first operating mode with the engine 22 of the vehicle running and a second operating mode with the engine 22 of the vehicle dormant. The second operating mode could be a number of different driving conditions, e.g. when the vehicle is coasting or temporarily stopped. The air conditioning system 20 is particularly effective when used in a hybrid-electric vehicle because the air conditioning system 20 of the exemplary embodiment continues to provide cooling for the cabin of the vehicle when the electric motor is driving the vehicle.

The air conditioning system 20 includes a refrigerant loop 24, generally indicated in FIG. 3, for cycling a refrigerant. The refrigerant loop 24 includes a compressor 26 for compressing the refrigerant to a superheated gas in the first operating mode. In the exemplary embodiment, the compressor 26 is operably connected to the engine 22 of the vehicle. In other words, the compressor 26 functions only when the engine 22 of the vehicle is running. Alternately, the compressor 26 could be electrically driven, e.g. when the air conditioning system 20 is used to cool a building, or for an electric vehicle without an engine 22.

The refrigerant loop 24 further includes a condenser 28 in fluid communication with the compressor 26 for receiving the superheated refrigerant and for transferring heat from the refrigerant to a first flow of air 30 to condense the refrigerant to a liquid. The refrigerant loop 24 further includes an expansion valve 32 in fluid communication with the condenser 28 for receiving the liquid refrigerant and for subcooling the refrigerant.

An evaporator 34 completes the refrigerant loop 24 and is in fluid communication with the expansion valve 32 for receiving the subcooled refrigerant. The evaporator 34 transfers heat from a second flow of air 36 to the refrigerant to evaporate the refrigerant to a gas and to cool the second flow of air 36. In the exemplary embodiment, the second flow of air 36 is for cooling the cabin of the vehicle in the first operating mode with the engine 22 of the vehicle running, but as explained above, the second flow of air 36 could also be for cooling a building.

Figure 1:
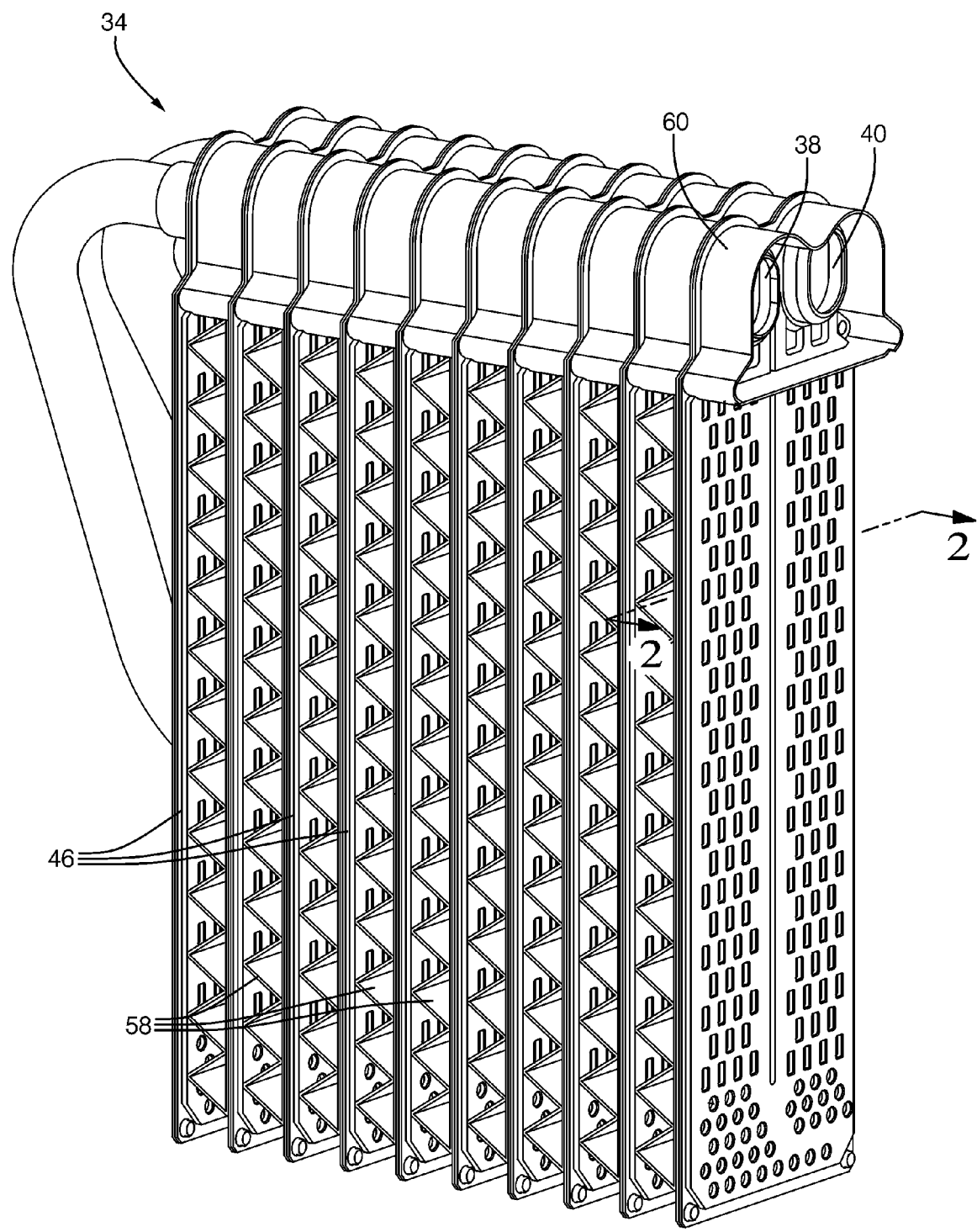
FIG. 1 is a perspective view of the exemplary embodiment of the evaporator.
Figure 2:
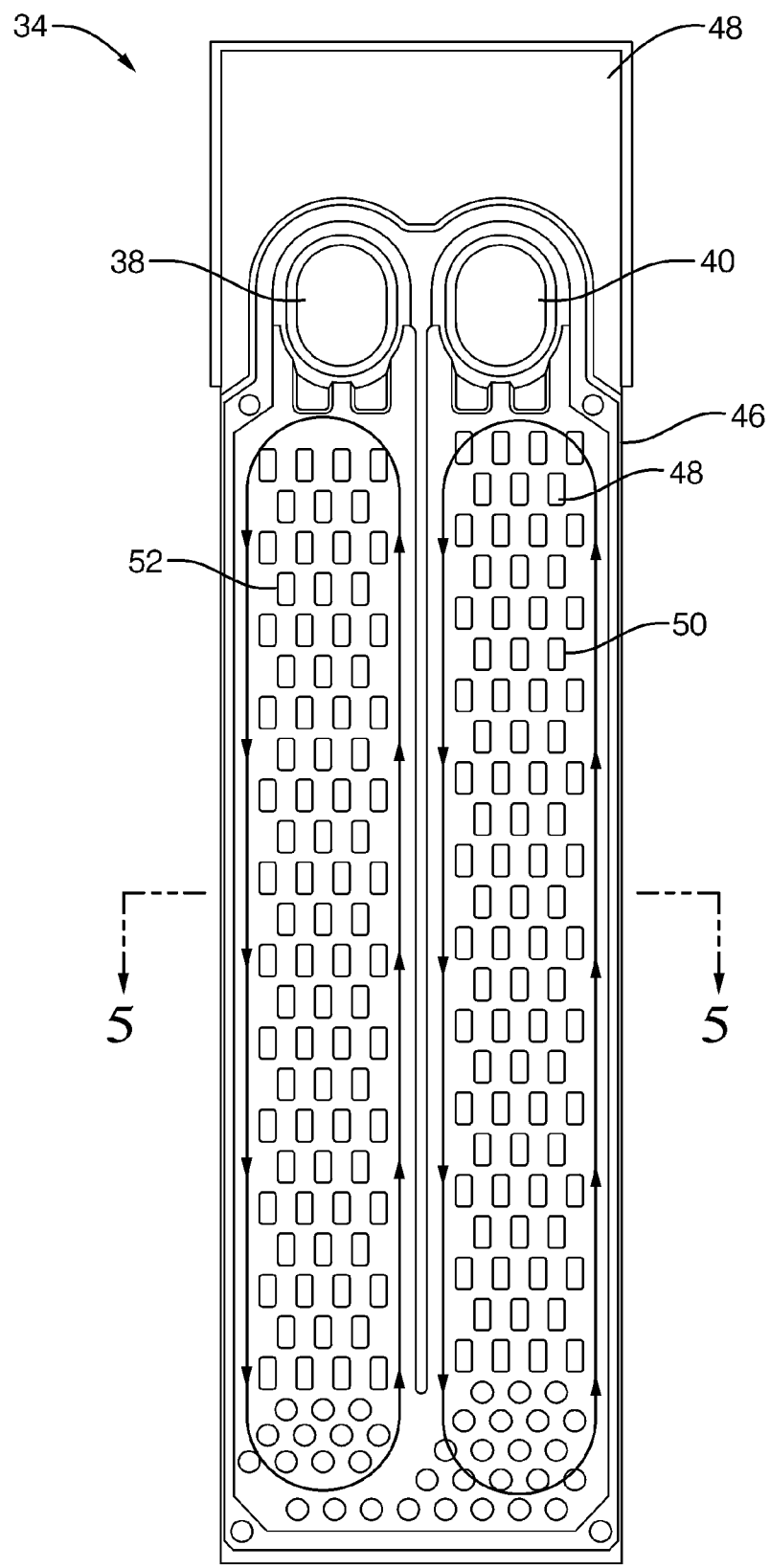
FIG. 2 is a cross-sectional view of the exemplary embodiment of the evaporator taken along line 2-2 of FIG. 1.

The evaporator 34 of the exemplary embodiment, generally shown in FIGS. 1 and 2, includes an input manifold 38 and an output manifold 40 extending in spaced and parallel relationship in a horizontal direction, best shown in FIGS. 1, 2 and 4. The input manifold 38 defines a plurality of input tube slots 42 horizontally spaced from one another, and the output manifold 40 defines a plurality of output tube slots 44 horizontally spaced from one another and aligned the input tube slots 42. The evaporator 34 further includes a plurality of tubes 46. In the exemplary embodiment with the air conditioning system 20 being in a vehicle, the tubes are preferably of aluminum. Where the air conditioning system 20 is used for cooling a building, the tubes are preferably of copper. Each of the tubes 46 defines a fluid passage 48 extending between the aligned input and output tube slots 42, 44 for conveying the refrigerant from the input manifold 38 to the output manifold 40. Each of the fluid passages 48 defines a first leg 50 in fluid communication with one of the input tube slots 42 and a second leg 52 in fluid communication with the aligned output tube slot 44. The first and second legs 50, 52 of the fluid passage 48 extend downward in parallel relationship with one another away from the input and output manifolds 38, 40. The first and second legs 50, 52 the fluid passage 48 are interconnected vertically below the input and output manifolds 38, 40 to define a U-shape for the fluid passage 48. As best shown in FIG. 5, each of the tubes 46 has a cross-section presenting flat sides 54 interconnected by round ends 56. Each of the first and second legs 50, 52 of the fluid passage 48 has a height H of at least 0.8 mm.

An air fin 58 is disposed between and engages the flat sides 54 of adjacent tubes 46 for receiving heat from the second flow of air 36. In the exemplary embodiment, the air fins 58 are brazed to the flat sides 54 of the adjacent ones of the tubes 46. The air fins 58 of the exemplary embodiment are also corrugated to increase heat transfer from the refrigerant in the evaporator 34 to the second flow of air 36.

The evaporator 34 defines at least one PCM tank 60 for storing a phase change material. When operating in the first operating mode heat is transferred from the phase change material to the subcooled refrigerant to cool and freeze the phase change material.

In the exemplary embodiment, the PCM tank 60 engages the input and output manifolds 38, 40. In the second operating mode, heat is transferred from the refrigerant to the frozen phase change material to cool and condense the refrigerant. The condensed refrigerant in the input and output manifolds 38, 40 increases in density and falls downwardly in the vertical direction through the first and second legs 50, 52 of the fluid passages 48 of the tubes 46, due to gravity. The condensed refrigerant then receives heat from the second flow of air 36 to cool the second flow of air 36 and evaporate the refrigerant. The evaporated refrigerant flows upwardly in the vertical direction through the first and second legs 50, 52 of the fluid passages 48 of the tubes 46 and back to the low pressure of the cool input and output manifolds 38, 40 where it is subsequently re-cooled and condensed by transferring heat to the frozen phase change material. In other words, in the exemplary embodiment, the evaporator 34 continues to cool the second flow of air 36, even when the vehicle is in the second operating mode with the engine 22 of the vehicle dormant.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air conditioning system comprising:
an evaporator having a refrigerant flowing therethrough for transferring heat from a flow of air to the refrigerant to cool the flow of air;
said evaporator including a manifold extending in a horizontal direction;
at least one tube in fluid communication with said manifold and extending downward in a vertical direction away from said manifold;
said evaporator defining at least one PCM tank for storing a phase change material to transfer heat from the phase change material to the refrigerant to cool and freeze the phase change material in said first operating mode; and
said PCM tank engaging said manifold for transferring heat from the refrigerant to the frozen phase change material to condense the refrigerant in a second operating mode whereby the condensed refrigerant falls downwardly in said vertical direction through said tube to receive heat from a flow of air to cool the flow of air in said second operating mode.

2. The system as set forth in claim 1 further including a plurality of tubes.

3. The system as set forth in claim 1 wherein said air conditioning system is for cooling the cabin of a vehicle having an engine and the flow of air is a second flow of air for cooling the cabin of the vehicle.

4. The system as set forth in claim 3 wherein said first operating mode is with the engine of the vehicle running.

5. The system as set forth in claim 4 wherein said second operating mode is with the engine of the vehicle dormant.

6. The system as set forth in claim 5 further including a refrigerant loop for cycling the refrigerant.

7. The system as set forth in claim 6 further including a compressor in said refrigerant loop and said compressor being operably connected to the engine of the vehicle for compressing the refrigerant to a superheated gas in said first operating mode.

8. The system as set forth in claim 7 further including a condenser in said refrigerant loop in fluid communication with said compressor for receiving the superheated refrigerant from said compressor and for transferring heat to a first flow of air to condense the refrigerant to a liquid.

9. The system as set forth in claim 8 further including an expansion valve in said refrigerant loop in fluid communication with said condenser for receiving the liquid refrigerant and for subcooling the refrigerant.

10. The system as set forth in claim 9 wherein said evaporator is in said refrigerant loop and is in fluid communication with said expansion valve for receiving the subcooled refrigerant and for transferring heat from a second flow of air to the refrigerant to evaporate the refrigerant to a gas and to cool the second flow of air for cooling the cabin of the vehicle in said first operating mode with the engine running.

11. The system as set forth in claim 1 wherein said manifold is an input manifold and said system further includes an output manifold extending in the horizontal direction in spaced and parallel relationship with said input manifold.

12. The system as set forth in claim 11 wherein said input manifold defines a plurality of input tube slots horizontally spaced from one another.

13. The system as set forth in claim 12 wherein said output manifold defines a plurality of output tube slots horizontally spaced from one another and aligned with said input tube slots.

14. The system as set forth in claim 13 wherein each of said tubes defines a fluid passage extending between said aligned input and output tube slots for conveying the refrigerant from said input manifold to said output manifold.

15. The system as set forth in claim 14 wherein each of said fluid passages includes a first leg in fluid communication with one of said input tube slots and extending downward in said vertical direction.

16. The system as set forth in claim 15 wherein each of said fluid passages includes a second leg in fluid communication with said aligned output tube slot and extending downward in said vertical direction.

17. The system as set forth in claim 16 wherein said first and second legs of said fluid passage of each of said tubes are interconnected vertically below said input and output manifolds to define said fluid passage as having a U-shape.

18. The system as set forth in claim 13 wherein said flow passage of each of said tubes has a height greater than 0.8 mm.

19. The system as set forth in claim 1 wherein said tubes are of aluminum.

20. The system as set forth in claim 1 wherein said tubes are of copper.

21. The system as set forth in claim 1 wherein each of said tubes has a cross-section defining spaced flat sides interconnected by round ends.

22. The system as set forth in claim 1 further comprising an air fin disposed between adjacent tubes for receiving heat from the second flow of air.

23. The system as set forth in claim 22 wherein said air fin is brazed to said adjacent tubes.

24. An air conditioning system for cooling the cabin of a vehicle having an engine comprising:
a refrigerant loop for cycling a refrigerant;
a compressor in said refrigerant loop and operably connected to the engine of the vehicle for compressing the refrigerant to a superheated gas in a first operating mode with the engine of the vehicle running;
a condenser in said refrigerant loop in fluid communication with said compressor for receiving the superheated refrigerant and for transferring heat from the refrigerant to a first flow of air to condense the refrigerant to a liquid in said first operating mode with the engine of the vehicle running;
an expansion valve in said refrigerant loop in fluid communication with said condenser for receiving the liquid refrigerant and for subcooling the refrigerant in said first operating mode with the engine of the vehicle running;
an evaporator in said refrigerant loop for receiving the subcooled refrigerant and for transferring heat from a second flow of air to the refrigerant to evaporate the refrigerant to a gas and to cool the second flow of air to cool the cabin of the vehicle in said first operating mode with the engine of the vehicle running;
said evaporator including an input manifold and an output manifold extending in spaced and parallel relationship with one another in a horizontal direction;
said input manifold defining a plurality of input tube slots horizontally spaced from one another;
said output manifold defining a plurality of output tube slots horizontally spaced from one another and aligned said input tube slots;
a plurality of tubes of aluminum;
each of said tubes defining a fluid passage extending between said aligned input and output tube slots for conveying the refrigerant from said input manifold to said output manifold;
each of said fluid passages having a first leg in fluid communication with one of said input tube slots and extending downward in said vertical direction from said input manifold and a second leg in fluid communication with said aligned output tube slot and extending downward in said vertical direction from said output manifold and said first and second legs of said fluid passage being interconnected vertically below said input and output manifolds to define said fluid passage as having a U-shape;
each of said tubes having a cross-section presenting flat sides interconnected by round ends;
an air fin disposed between and brazed to said flat sides of adjacent ones of said tubes and being corrugated for receiving heat from the second flow of air;
said evaporator defining at least one PCM tank for storing a phase change material to transfer heat from the phase change material to the refrigerant to cool and freeze the phase change material in the first operating mode with the engine of the vehicle running; and
said PCM tank engaging said input and output manifolds for transferring heat from the refrigerant to the frozen phase change material to condense the refrigerant in a second operating mode with the engine of the vehicle dormant whereby the condensed refrigerant falls downwardly in said vertical direction through said first and second legs of said fluid passages of said tubes to receive heat from the second flow of air to cool the second flow of air in said second operating mode.

* * * * *